(12) United States Patent
Stickles

(10) Patent No.: US 10,538,133 B2
(45) Date of Patent: Jan. 21, 2020

(54) TOW HOOK STEP COMBINATION

(71) Applicant: Bestop, Inc., Louisville, CO (US)

(72) Inventor: George C. Stickles, Thornton, CO (US)

(73) Assignee: Bestop, Inc., Louisville, CO (US)

( * ) Notice: Subject to any disclaimer, the term of this patent is extended or adjusted under 35 U.S.C. 154(b) by 119 days.

(21) Appl. No.: 15/600,137

(22) Filed: May 19, 2017

(65) Prior Publication Data

US 2017/0334257 A1 Nov. 23, 2017

Related U.S. Application Data

(60) Provisional application No. 62/338,643, filed on May 19, 2016, provisional application No. 62/360,037, filed on Jul. 8, 2016.

(51) Int. Cl.
  *B60D 1/58* (2006.01)
  *B60R 3/02* (2006.01)
  *B60D 1/04* (2006.01)

(52) U.S. Cl.
  CPC ............... *B60D 1/58* (2013.01); *B60D 1/04* (2013.01); *B60R 3/02* (2013.01)

(58) Field of Classification Search
  CPC ............... B60D 1/04; B60D 1/58; B60R 3/02

USPC ........................................................ 280/415.1
See application file for complete search history.

(56) References Cited

U.S. PATENT DOCUMENTS

| | | | | |
|---|---|---|---|---|
| 7,081,197 | B1* | 7/2006 | Davis | B60D 1/00 280/507 |
| 9,085,264 | B2* | 7/2015 | Anderson | B60R 3/007 |
| 9,199,520 | B2* | 12/2015 | Weipert | B60D 1/07 |
| 9,233,586 | B1* | 1/2016 | Howard | B60D 1/58 |
| 2008/0042394 | A1* | 2/2008 | Park | B60R 3/02 280/166 |
| 2009/0045604 | A1* | 2/2009 | Bernart | B60D 1/58 280/477 |

* cited by examiner

*Primary Examiner* — Joseph M Rocca
*Assistant Examiner* — Felicia L. Brittman
(74) *Attorney, Agent, or Firm* — Warn Partners, P.C.

(57) ABSTRACT

A tow hook step assembly having a step and hook combination that attaches to current bumpers or other vehicle components with "D" ring brackets. When not in tow position, the assembly acts as a heavy duty step in a step mode position. When towing is desired, the assembly automatically rotates into the towing mode position. The step is adjustable to accommodate any vehicle applications. An accessory access area is also provided to connect any accessories when desired.

18 Claims, 20 Drawing Sheets

TOW HOOK STEP COMBINATION

CROSS-REFERENCE TO RELATED APPLICATIONS

This application claims the benefit of U.S. Provisional Application No. 62/338,643, filed May 19, 2016 and U.S. Provisional Application No. 62/360,037, filed Jul. 8, 2016. The disclosures of the above applications are incorporated herein by reference.

FIELD OF THE INVENTION

The present invention relates to an adjustable step with a towing member and area of attachment for mounting to a vehicle.

BACKGROUND OF THE INVENTION

"D" ring brackets are commonly used on vehicles, such as on trucks and sport utility vehicles (SUV) for recreational purposes. Generally, the D-rings are fixedly connected to the bumper or integrally formed on the bumper to provide an area for attachment of a rope, chain or other simple towing scheme or strap. Typically, the D-rings provide an extraction point or tow point once the strap is applied. Straps are typically connected for extraction or towing of the vehicle by known methods, such as by a winch or hitch connected to another vehicle, or for pulling another vehicle, a boat trailer or any other object to which the other end of the strap is attached. Typical D-rings require tools to remove and loop the strap onto the D-ring. Overall, the D-ring has limited function. Common D-rings do not provide a step design, e.g., no step in order to access the roof of vehicle. They also do not provide attachment of other accessories.

Tow hooks are also generally known. Generally, these have a bracket for fixedly connecting to the bumper and provide an area for looping a strap, e.g., on a hook, eyelet, horseshoe, etc. As with the D-ring, typically, these are used for extraction, pulling or being pulled. However, common tow hooks do not provide step design. They also do not provide attachment for other accessories.

Accordingly, there exists a need for an easily attachable step/tow hook assembly that is adjustable depending on the vehicle application and that is easy to use, where the assembly provides both a heavy duty step up when desired and towing capability when desired.

SUMMARY OF THE INVENTION

The present invention is directed to a tow hook step assembly having a step and hook combination providing a one-piece step/tow hook that attaches to current bumpers or other vehicle components with "D" ring brackets or any other suitable attachment part that meets predetermined load and strength requirements. When not in tow position, the assembly acts as a heavy duty step in a step mode position. When towing is desired, the assembly automatically rotates into a towing mode position. The step is adjustable to accommodate any vehicle applications. An accessory access area is provided to connect any accessories when desired, according to an embodiment of the present invention.

According to another embodiment of the present invention, the assembly acts as a heavy duty step when in a generally horizontal position. The assembly also acts as a heavy duty tow when in the generally horizontal position. Thus, the generally horizontal position provides a combination step/tow position. According to one embodiment, the tow hook step assembly is also adjustable when not in use to a stowed position to reduce the distance the assembly protrudes out from the vehicle. The tow hook step assembly is then deployed to the generally horizontal position when stepping up or towing is desired.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Referring to the figures generally, the present invention provides an easily installable/removable unit mountable in any of a plurality of predetermined locations on a vehicle, e.g., on a bumper (front and/or rear), and/or any other predetermined vehicle attachment points depending on the application, and provides the ability to easily step up when desired or automatically move into a towing position when desired. The present invention provides the advantage of a 1-piece step and tow hook that attaches to many of the current bumpers with "D" ring brackets. When not in the tow position, it acts as a heavy duty step. This design also provides an access hole for accessories. According to one embodiment, there is provided a combination tow/step position. When in the tow position it also acts as a heavy duty step. When the tow/step is not desired, the assembly is stowable. Preferably, the assembly is adjustable to accommodate any vehicle applications.

Figure 9:
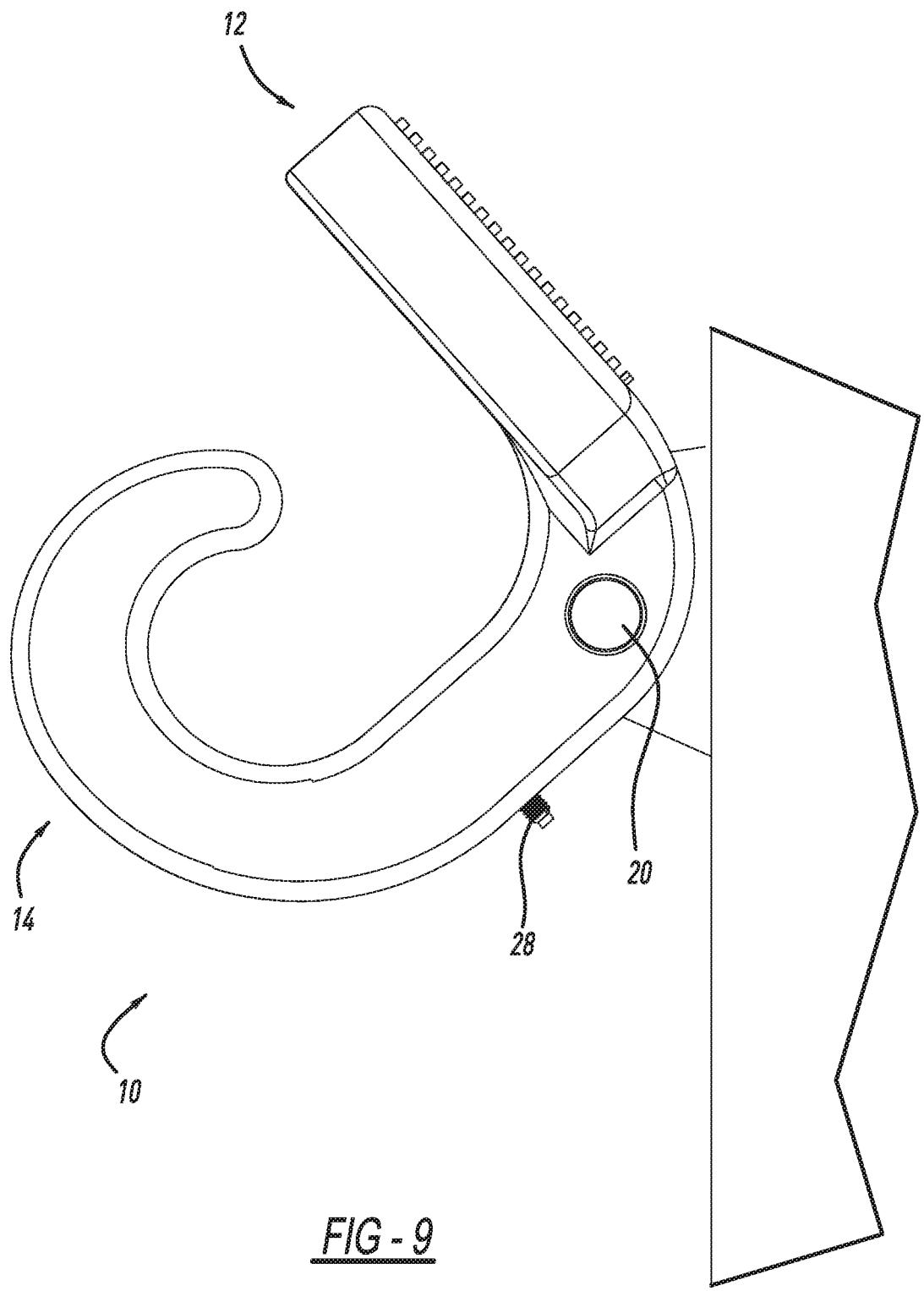
FIG. 9 is a right side elevation view of FIG. 7.
Figure 10:
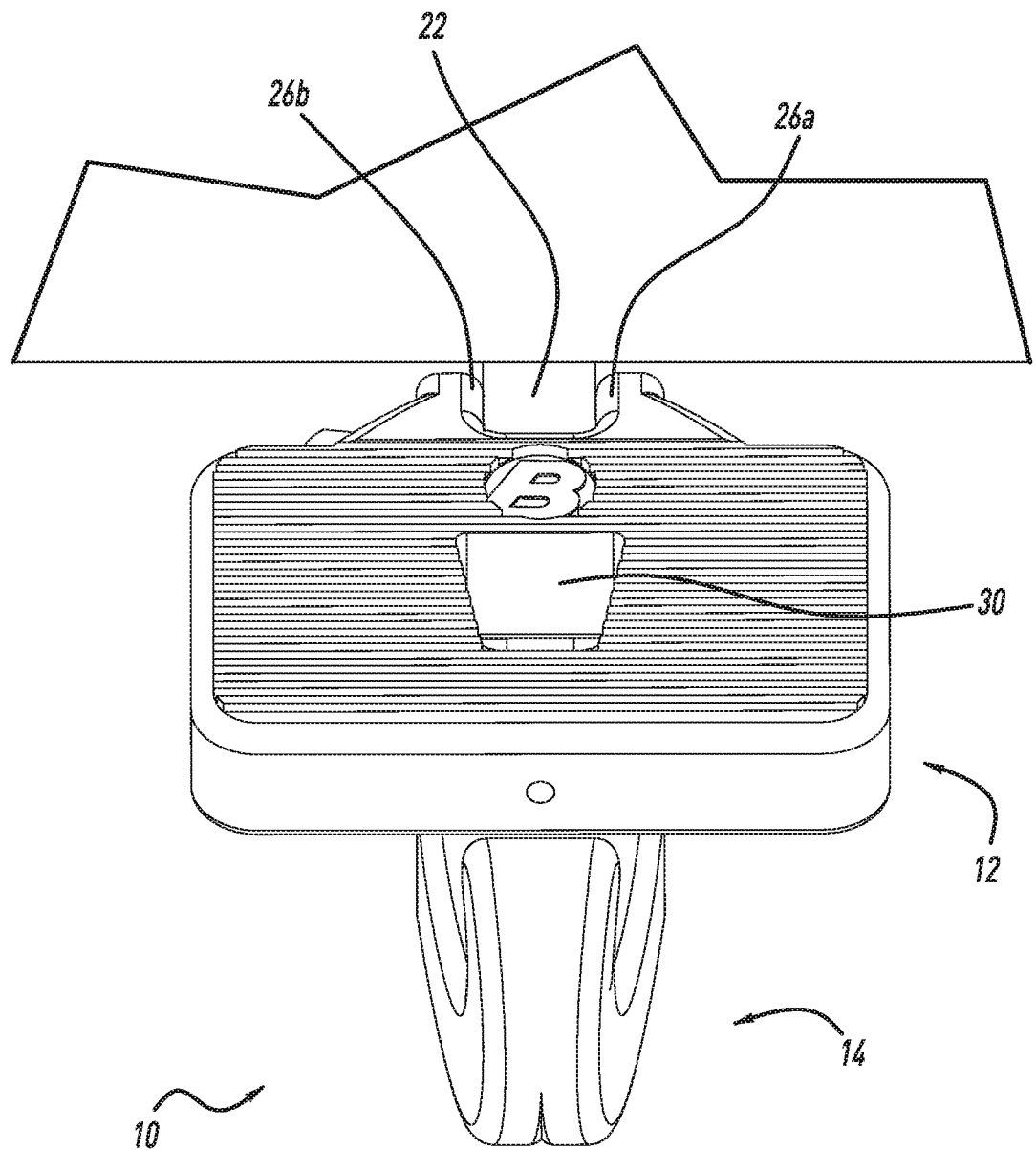
FIG. 10 is a top plan view of FIG. 7.

Referring to FIGS. 1-10, there is provided a tow hook step assembly shown generally at 10, in accordance with the present invention, that is moveable between at least a step position and a towing position. FIGS. 1-7 illustrate an exemplary step position. FIGS. 9-10 illustrate an exemplary towing position. The present invention adds a step to the bumper or other vehicle part in order to access the roof of vehicle, which is a significant advantage over conventional D-rings and tow hooks. The simple assembly 10 of the present invention also provides a step and tow hook combined into one piece.

The assembly 10 includes a tow/step combination having at least one step portion shown generally at 12 and at least one tow hook portion shown generally at 14. In the step mode position, the step portion 12 is generally horizontal to provide a stepping surface. At least one step surface 16 (e.g., metal stepping surface, grooved metal surface for traction, rubber pad, etc) is integrally formed with or affixed on the step portion 12 to provide a stepping surface for a user when the assembly 10 is in the step position.

The tow hook portion 14 is provided with at least one assembly mounting portion or "attachment portion", indicated generally at 18, to pivotally mount the assembly 10 to the vehicle. Typically, there is provided at least one fastener 20, such as a pin, rod, bolt, flanged bolt or any other fastener suitable to pivotally attach to a corresponding vehicle bumper or any other predetermined vehicle part. Preferably, the fastener 20 extends through a D-ring 22 of a vehicle bumper shown generally at 24. Typically, the bumper portion carrying the D-ring 22 is a metal bracket or any other portion of the bumper that meets predetermined load and strength requirements. The mounting portion 18 is pivotally mounted over the D-ring 22. Preferably, the mounting portion 18 straddles the D-ring 22. Most preferably, the mounting portion 18 provides a pair of opposing members 26a, 26b with a pivotal connection to the D-ring 22 that is located therebetween.

The assembly 10 is easily removable by removal of the fastener 20, e.g., unthreading a nut and removing the bolt from the attachment portion 18. The assembly 10 is in stepping position ("step mode" or "step position") when not in use, and rotates (to the towing position or "tow mode") to become a heavy duty extraction point or tow hook once a strap is applied.

Figure 7:
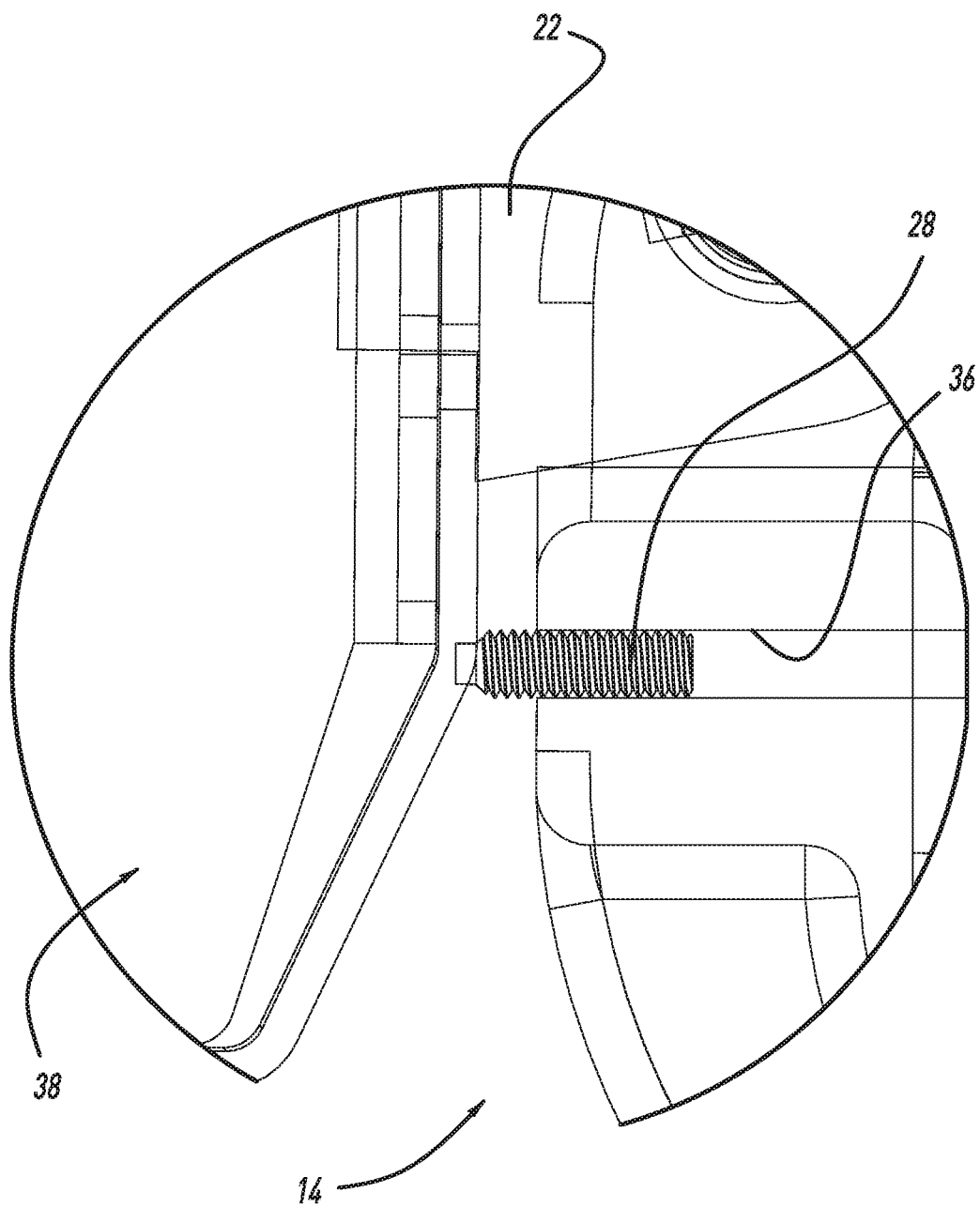
FIG. 7 is an enlarged view of a jack screw area and an angled vehicle component.
Figure 8:
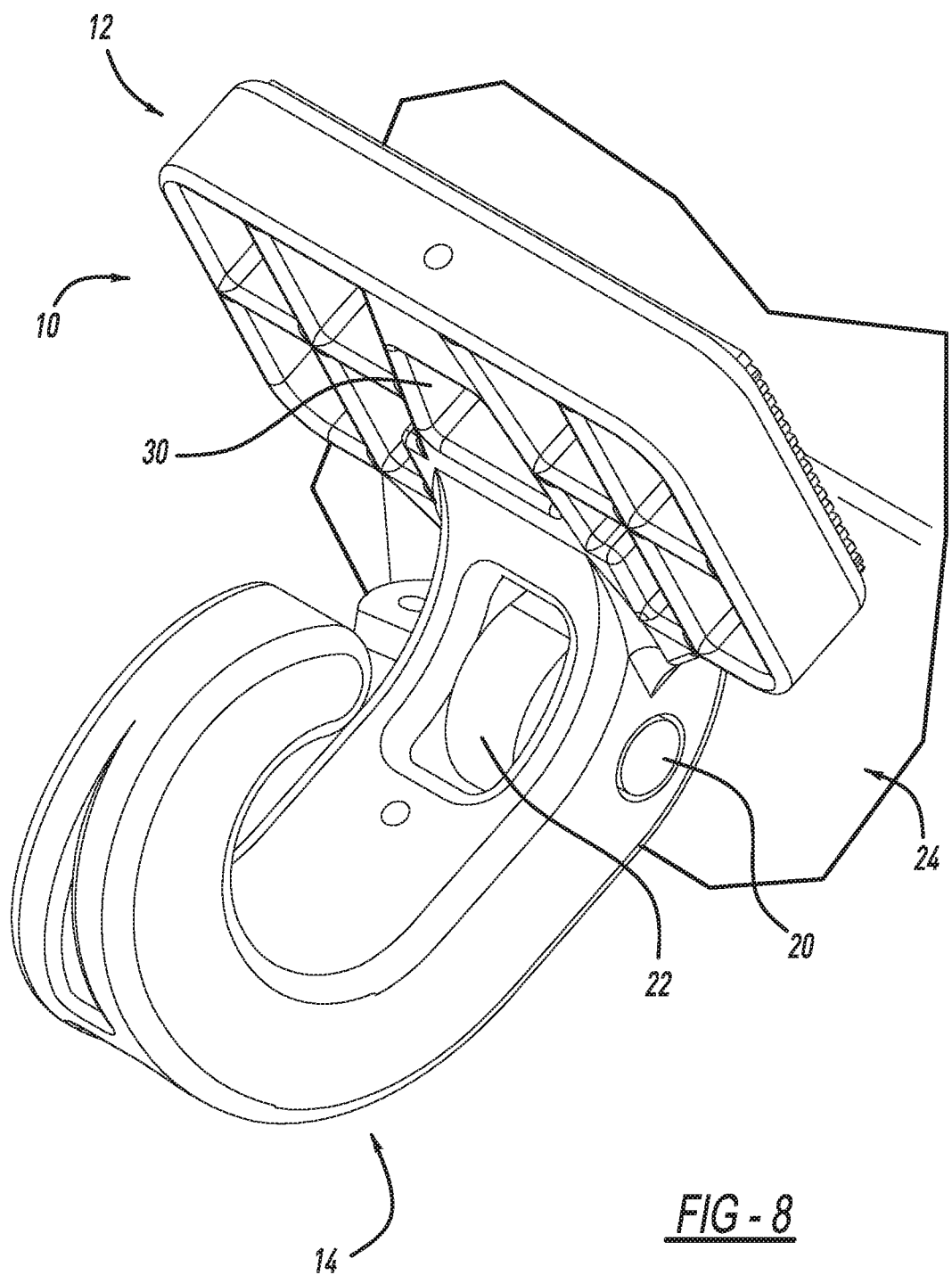
FIG. 8 is a perspective view of the tow hook step assembly of FIGS. 1-7 shown in a towing mode position, in accordance with the present invention.

The tow hook step assembly 10 also has at least one adjustment mechanism 28 operable to selectively adjust the angle depending on the particular application, e.g., a jackscrew or other screw or suitable device for adjusting angle of the unit 10. The adjustment mechanism 28 adjusts the assembly 10, e.g., adjusts the step in the horizontal position, in the case of a bumper with an angled face. Typically, the adjustment mechanism 28, e.g., $5/16 \times 18$ jack screw, moves inward and outward in an aperture 36 provided in the casting of the tow hook portion 14 to adjust the angle on the step for angled vehicle bumpers (or other vehicle part). FIG. 7 illustrates an example of a vehicle component 38 with an angled surface. The adjustment mechanism 28 has at least one bumper 31, e.g., rubber cap or bumper, located to prevent rattle and scratching of bumper finish by the adjustment mechanism 28. The adjustment mechanism 28 can also help prevent damage to the bumper by keeping the rear surface 29 of the assembly from contacting the vehicle part. Thus, the present invention effectively and efficiently combines the step 12 and hook 14 as one accessory that is easily removable and that can adjust to any angled bumper face with the adjustment mechanism 28.

The tow hook step assembly 10 also has at least one accessory aperture 30 for selectively attaching at least one secondary component or accessory. Preferably, the accessory hole 30 is provided through the step portion 12. At least one aperture 32 is provided for receiving at least one respective second fastener 34, such as a locking screw or the like, for operably connecting the accessory (such as trail vice, auxiliary fuel storage tank, Hi Lift Jack bracket, etc).

The tow hook portion 14 is a vertical tow hook, according to an embodiment of the present invention, preferably, a hood hanging downward with a step on top. The tow hook portion 14 is generally hook-like shaped to receive a rope, strap, chain, cord or the like and rotates and holds the strap to become a heavy duty extraction point or tow hook once the strap force is applied. Typically, the hook portion 14 is generally rotated upward and downward depending on the step and tow modes desired. Any other shapes (and latched, hinged, swivel, or screwed carabineer like, etc) for the tow portion 14 suitable for predetermined requirements, are contemplated without departing from the scope of the present invention. Optionally, a protrusion or raised edge on the distal end of the hook portion 14 provides further retention of the rope or strap.

The present invention, utilizing "D" Ring attachment mount(s) 22 found on many bumpers 24, provides a step surface 12, 16 in order to reach vehicle racking, clean the vehicle roof, work on the engine of many lifted SUVs or trucks, or any other purpose where the operator wants to step up (e.g., 4-door Jeep™ types, 2-door Jeep™ types, SUVs, trucks, hybrids, crossovers, utility task vehicles, and any other type of vehicles). This design is also a tow hook for vehicle extraction. After operably looping or otherwise coupling the tow rope or strap over the assembly 10, the assembly automatically rotates, e.g., rotates 35-90 degrees, into towing position when the rope/strap is pulled capturing the tow rope or strap for vehicle extraction.

Figure 1:
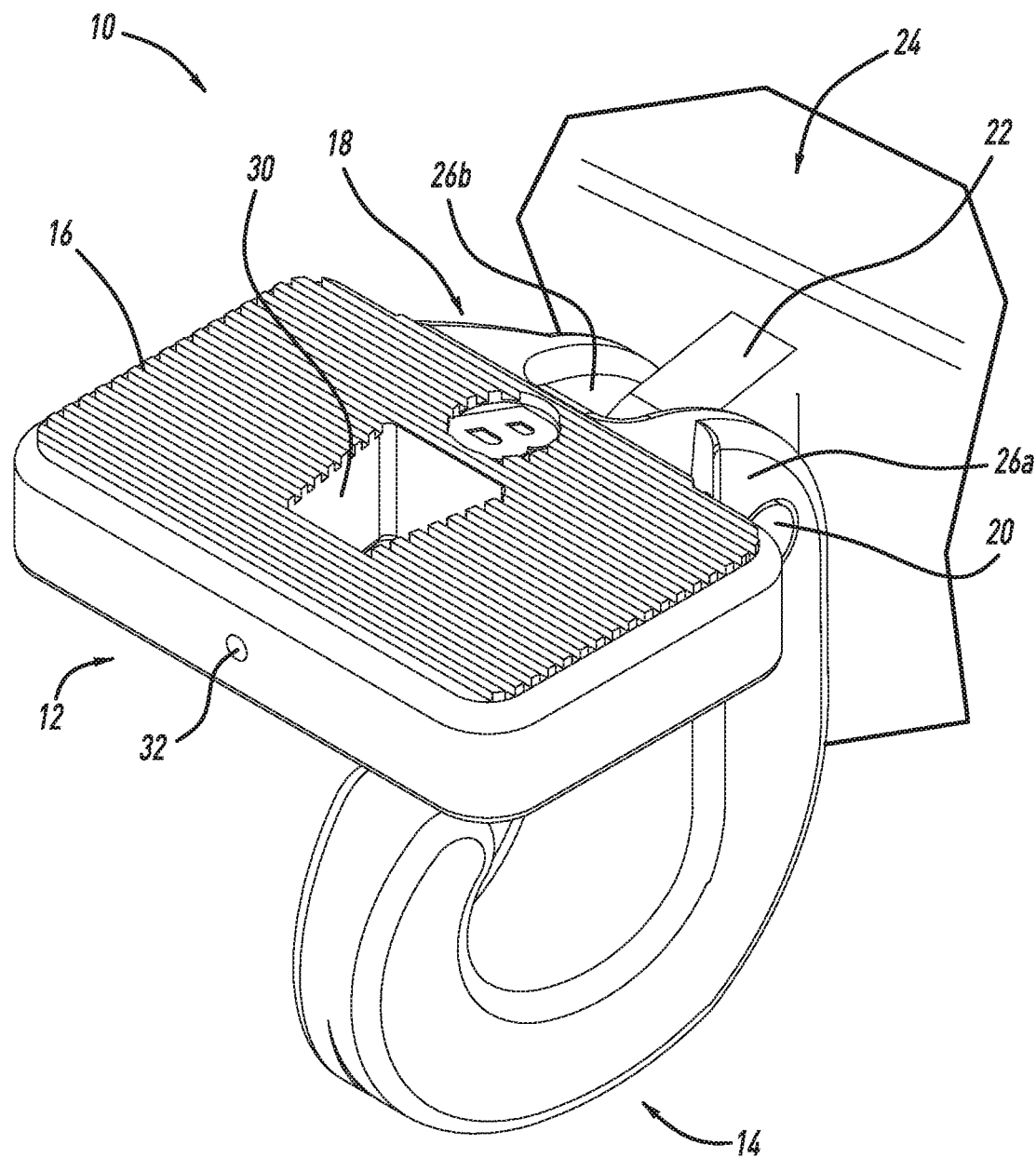
FIG. 1 is a perspective view of a tow hook step assembly mounted to a vehicle and shown in a step mode position, in accordance with an embodiment of the present invention.
Figure 2:
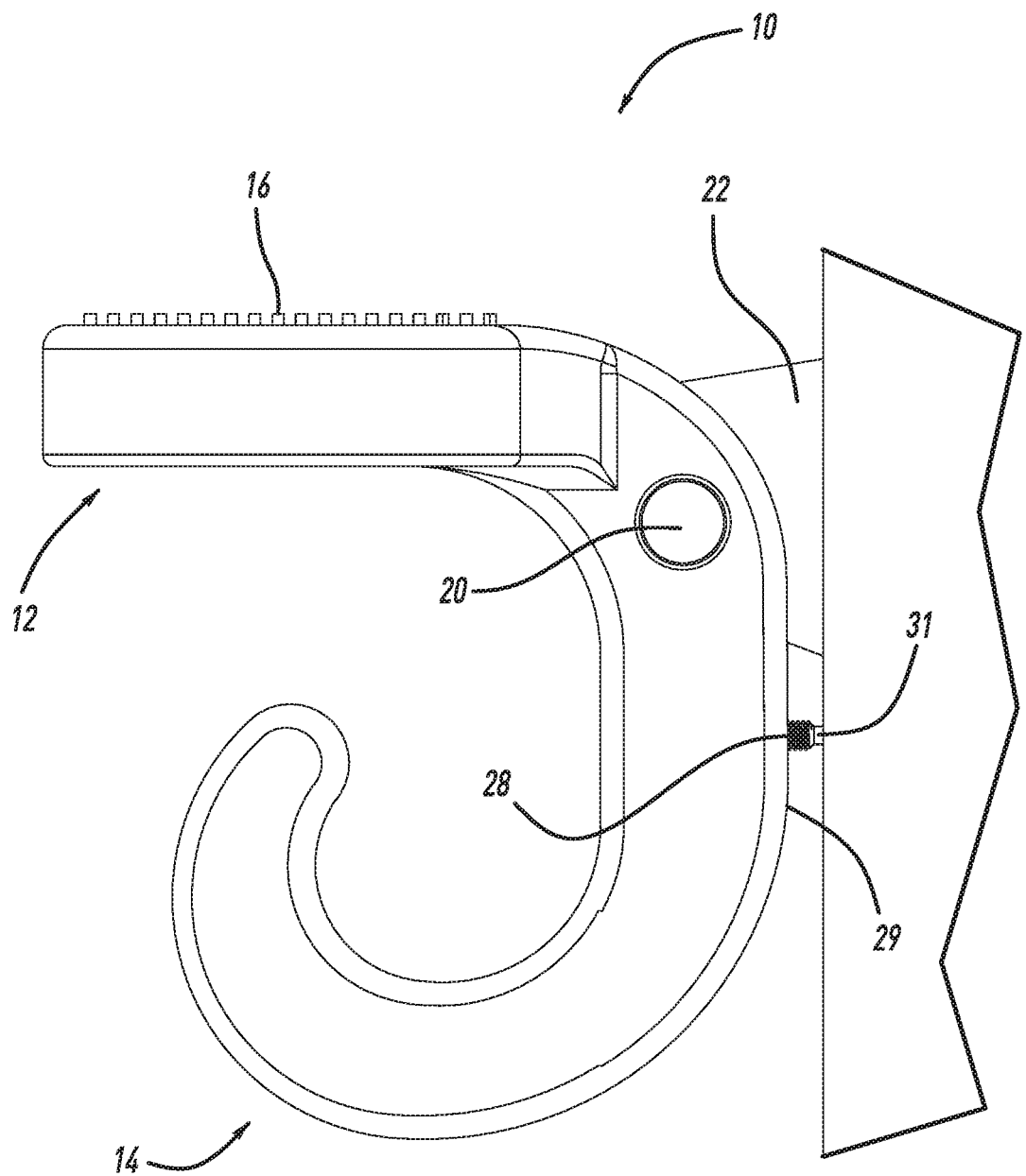
FIG. 2 is a right side elevation view of FIG. 1.
Figure 3:
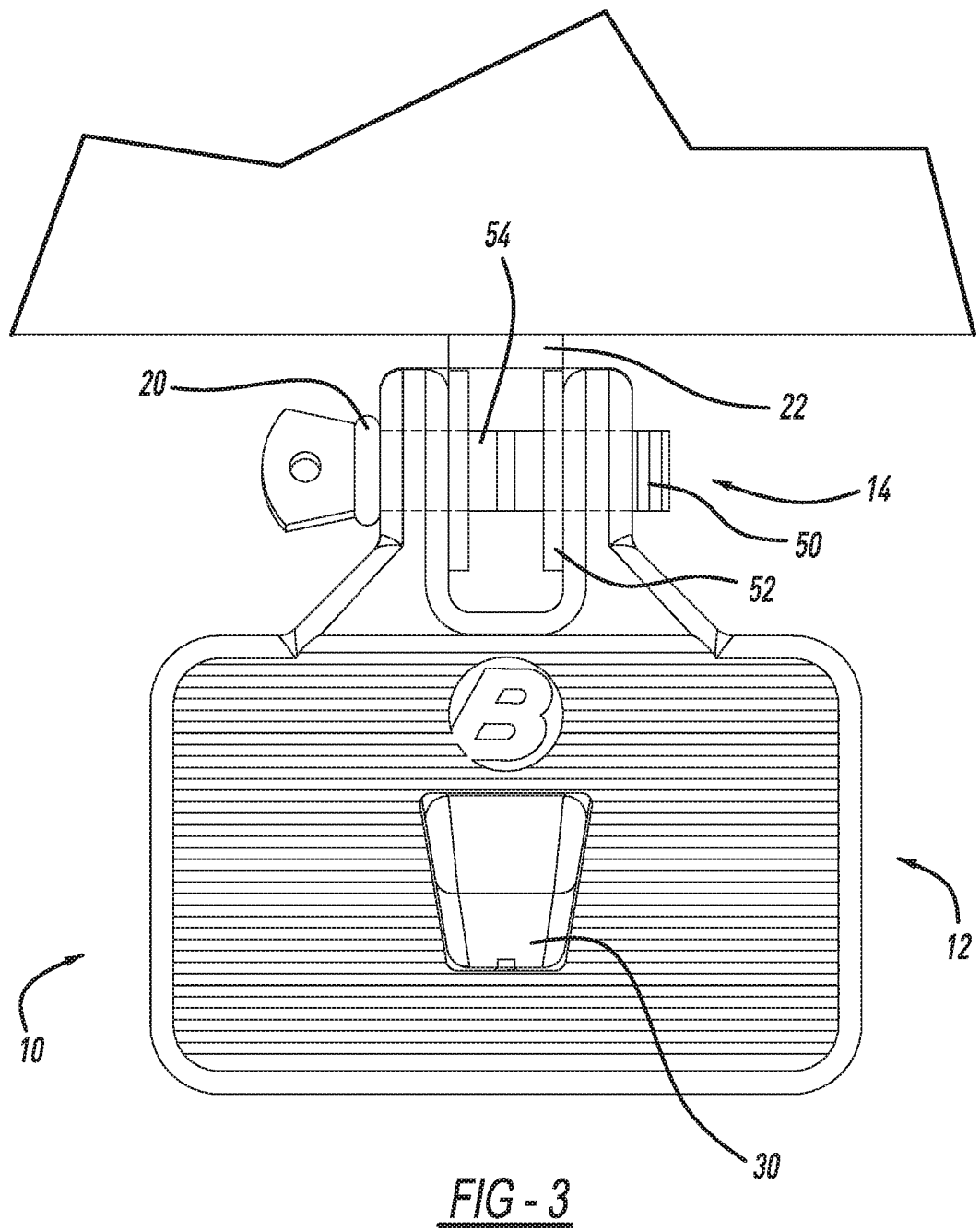
FIG. 3 is a top plan view of FIG. 1.
Figure 4:
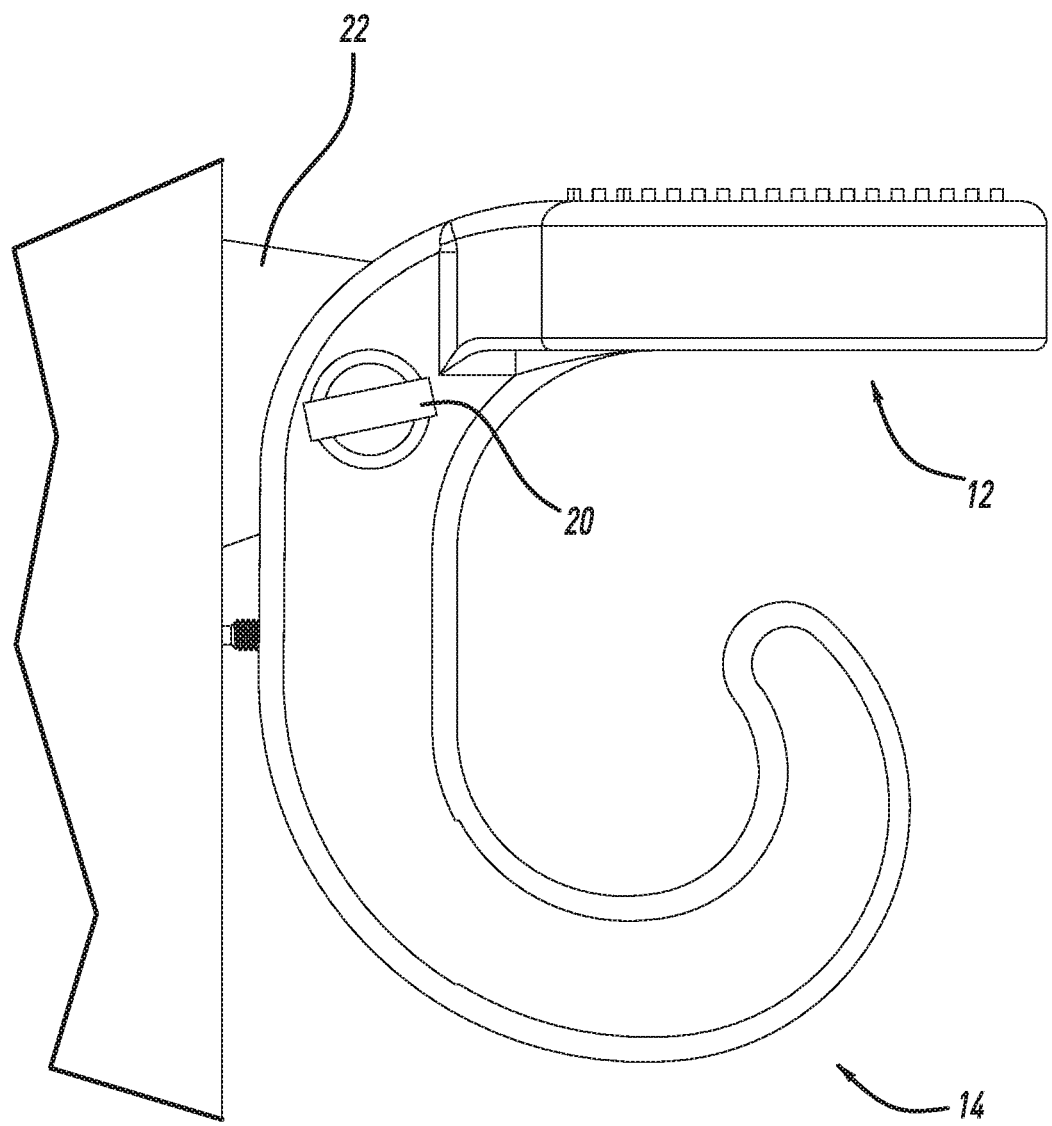
FIG. 4 is a left side elevation view of FIG. 1.
Figure 5:
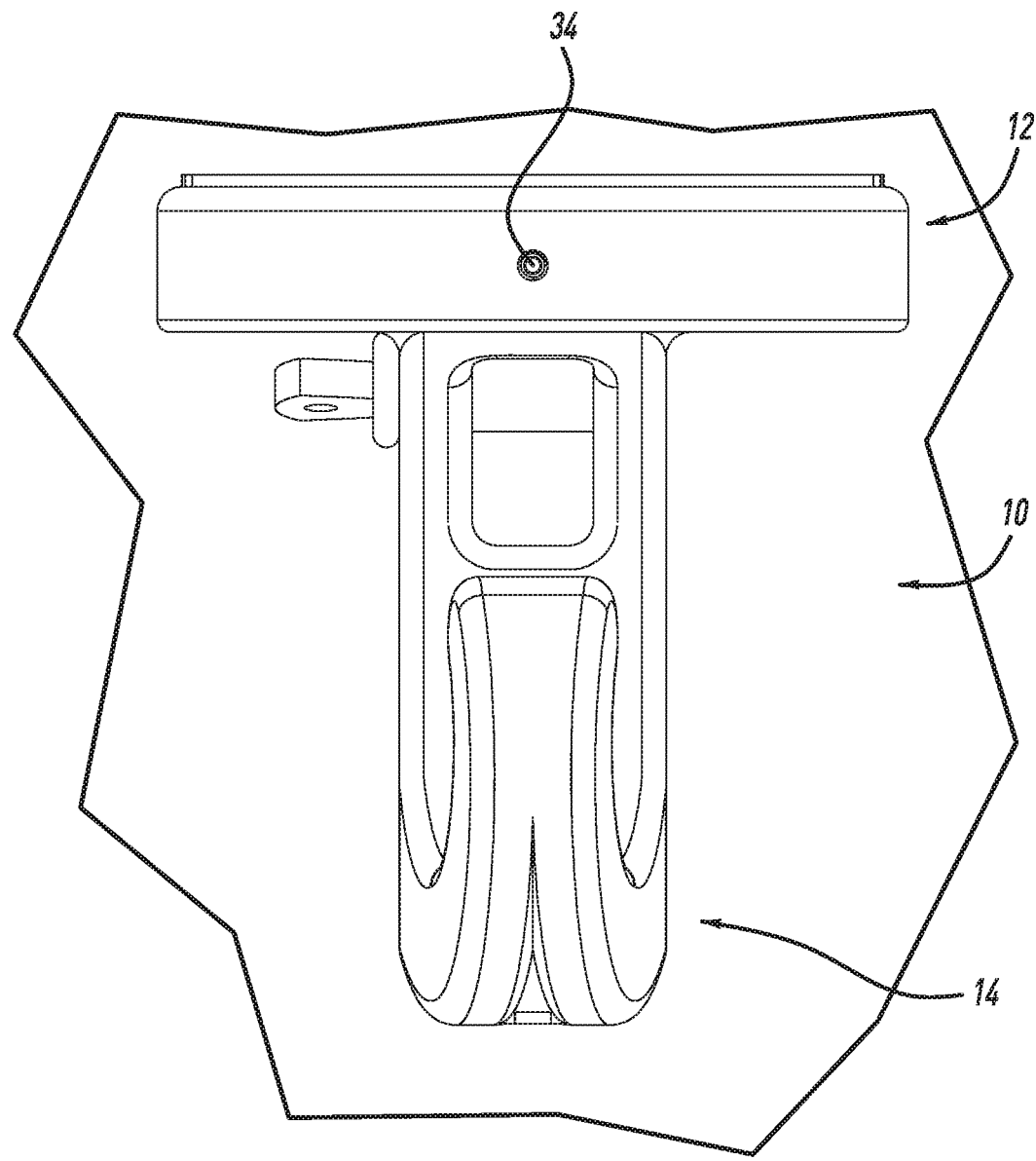
FIG. 5 is a front elevation view of FIG. 1.
Figure 6:
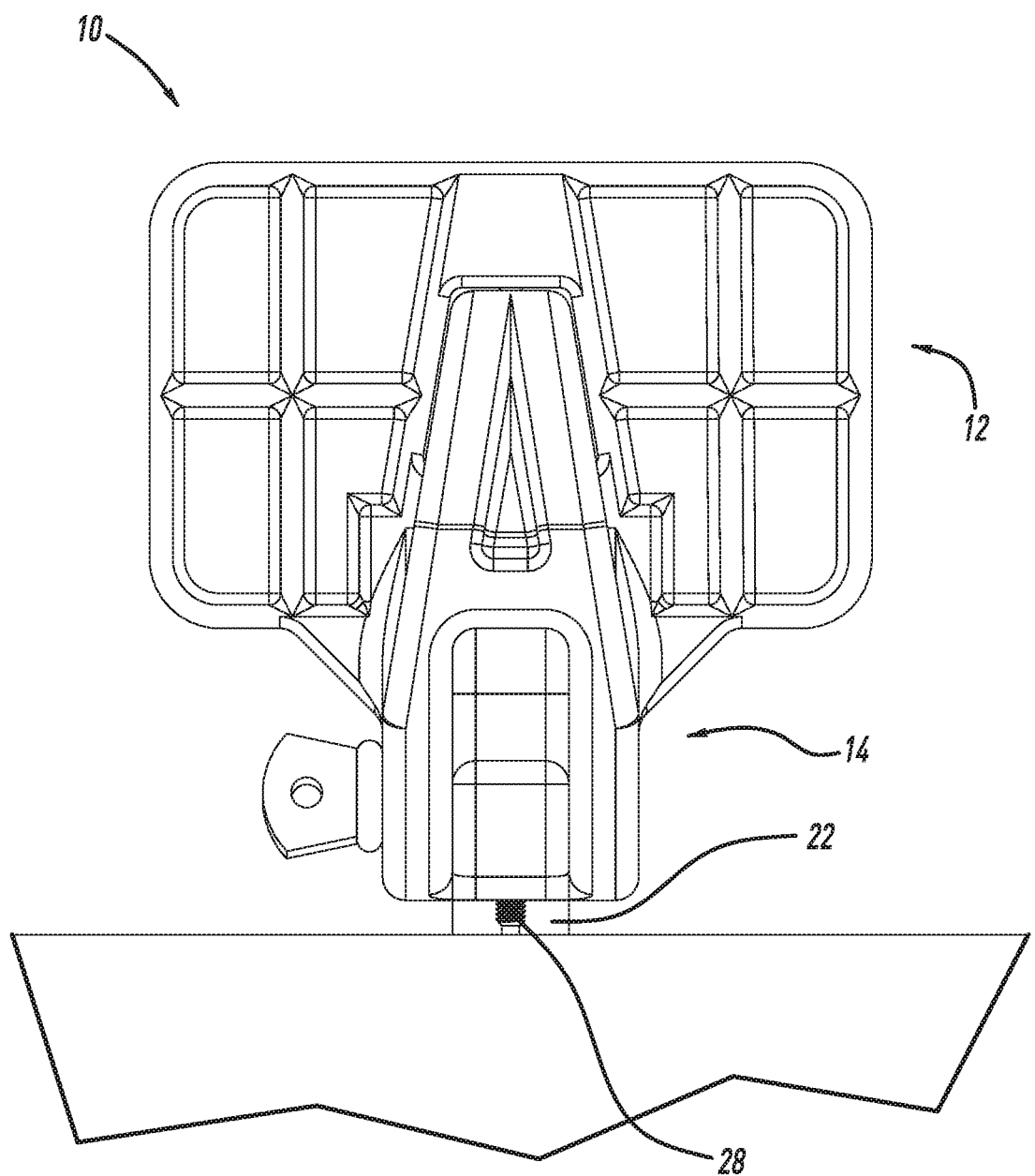
FIG. 6 is a bottom plan view of FIG. 1.

At least one inner rubber bushing to add resistance to keep the step up for driving or trail riding is provided. This helps increase ground clearance as well. FIG. 3 depicts a threaded rod 50 of the fastener 20 through the D-ring 22 aperture and with two bushings 52, 54, most preferably, flanged bushings. The bushings 52, 54 have a durometer of 80 Shore A. However, other durometers and materials are contemplated depending on the application without departure from the scope of the present invention. The resistance is overcome when moving back to the other position is desired.

Typically, the step portion 12 and/or tow hook portion 14 are metal, preferably, steel. Other materials suitable to meeting predetermined requirements depending on the application are contemplated without departing from the scope of the present invention. Typically, the step portion 12 and tow hook portion 14 are integrally formed. Alternatively, they are separate pieces connected together forming a mountable unit.

At least one tow hook step assembly 10 is attached to the bumper 24 (or other vehicle part). A plurality of tow hook step assemblies 10 each attached to a respective one of a plurality of D-rings 22 on the bumper 24 (or other vehicle part, bracket, etc) is contemplated without departing from the scope of the present invention.

Figure 11:
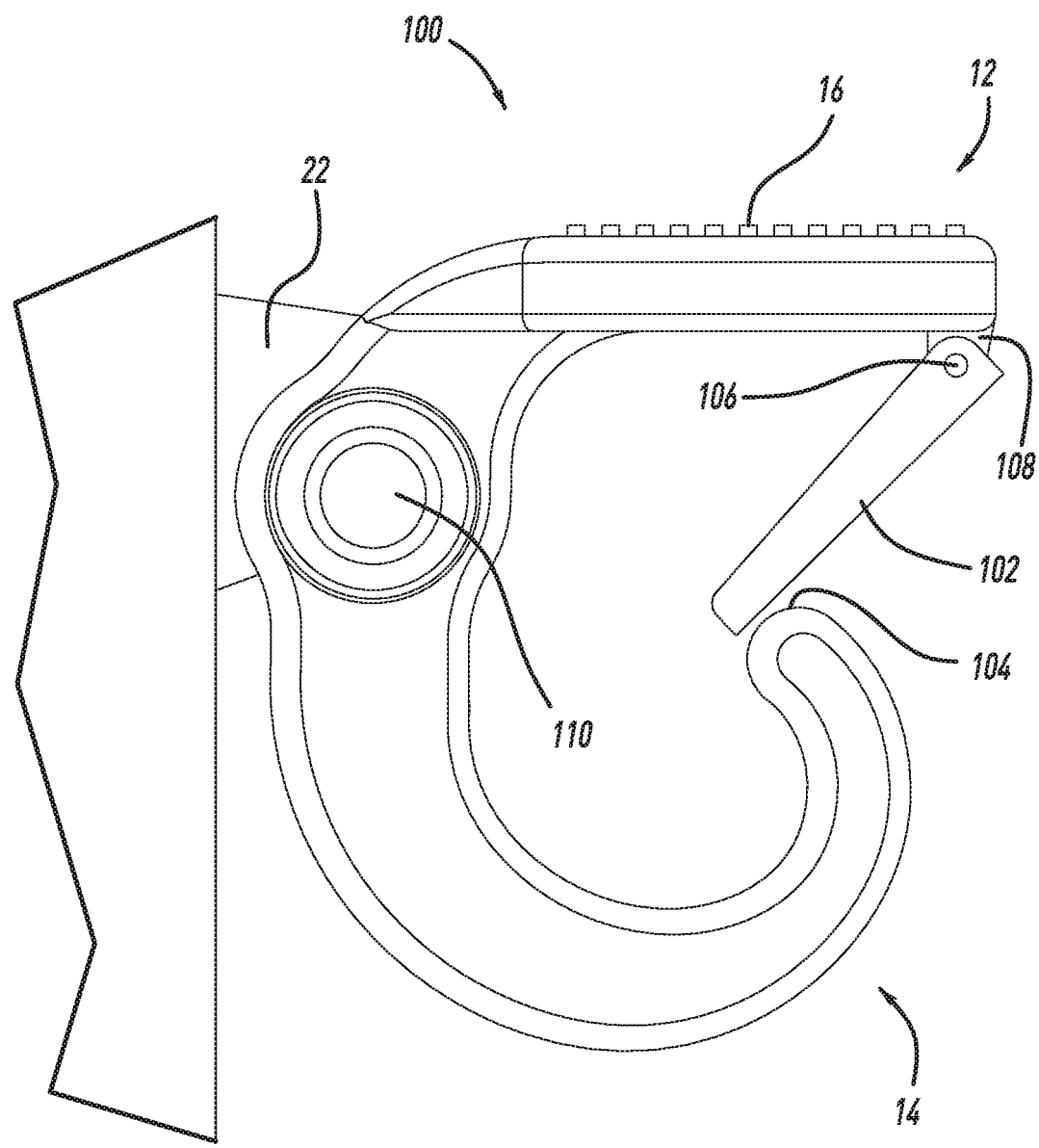
FIG. 11 is a left side elevation of FIG. 7.
Figure 12:
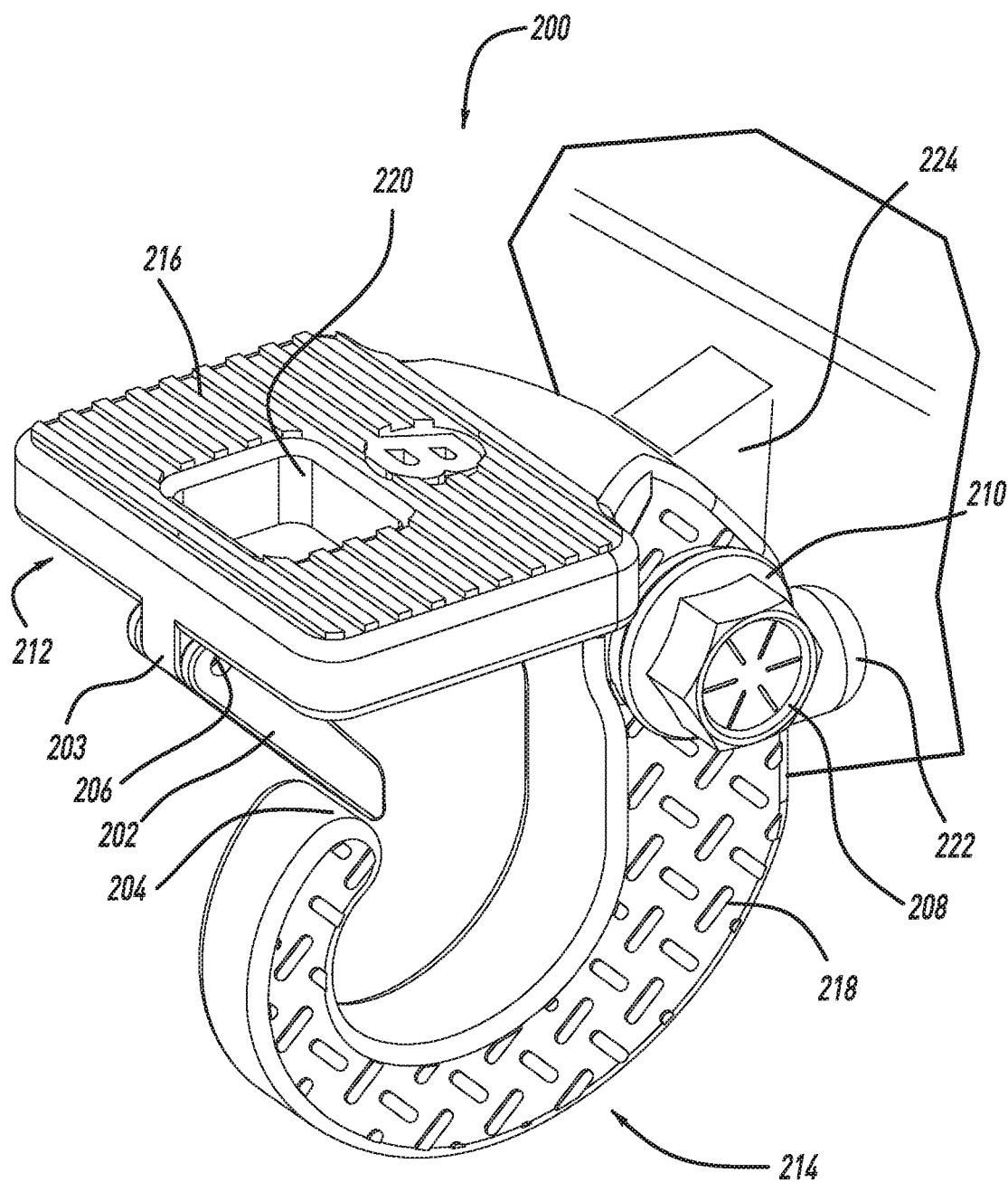
FIG. 12 is a perspective view of a tow hook step assembly including a locking mechanism, the assembly depicted mounted to a vehicle and shown in a step mode position, in accordance with another embodiment of the present invention.

Referring to FIG. 11, in accordance with another embodiment of the present invention, there is provided a tow hook step assembly generally shown at 100 for providing a step/hook combination. The tow hook step assembly 100 is similar to the tow hook step assembly 10 shown in FIGS. 1-10, e.g., it includes a step portion 12 with a stepping surface 16, a hook portion 14, is connectable to a D-ring 22 of a vehicle bumper 24, has an adjustment mechanism 28, and is moveable between at least a step position and a towing position—all as explained previously in regard to FIGS. 1-10.

However, there is additionally provided at least one locking mechanism 102 to further help prevent the tow strap or tow rope from moving laterally out of the hook portion 14. Typically, the locking mechanism 102 is a locking tab that swivels to generally close off the gap 104 of the hook portion 14 when desired. Preferably, a fastener 106, e.g., locking pin, rotatably connects the locking mechanism 102 to a bracket 108 on the step portion 12 toward one end, and the other end of the locking mechanism 102 closes off against the hook portion 14. Alternatively, the locking mechanism 102 is rotatably connected to a bracket or other feature on the hook portion 14 and closes off against the step 12. The locking mechanism 102 is operably biased to the closed position, in one preferred embodiment, e.g., with a spring.

Optionally, the hook portion 14 is also sized to accommodate a larger diameter fastener through the boss 110, which fastener extends through the D-ring 22 of the vehicle component, similarly as explained previously. However, it is understood that any desired diameter and profile of the boss 110 for the fastener 20 is contemplated, including as determined by the particular attachment requirements/constraints depending and meeting suitable load requirements, without departure of the scope of the present invention.

At least one inner rubber bushing to add resistance to keep the step up for driving or trail riding can be provided, as set forth above.

Referring now to FIGS. 12-15, according to another embodiment of the present invention, there is provided a tow hook step assembly shown generally at 200 that is moveable between at least a step position and a towing position, similarly as previously shown and described, however the attachment portion is mounted to the side of the D-ring (or other vehicle component).

Figure 13:
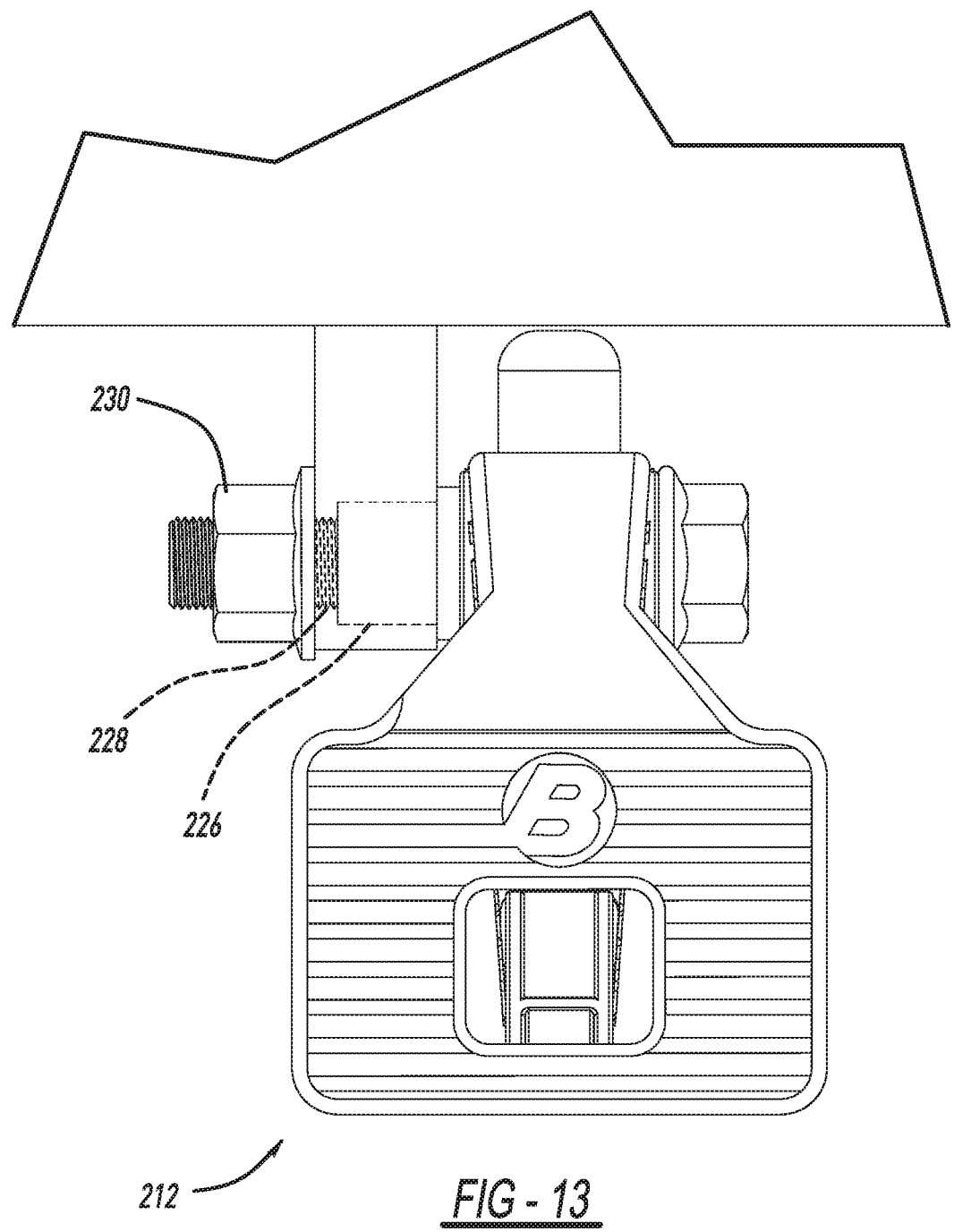
FIG. 13 is a top plan view of FIG. 12.
Figure 14:
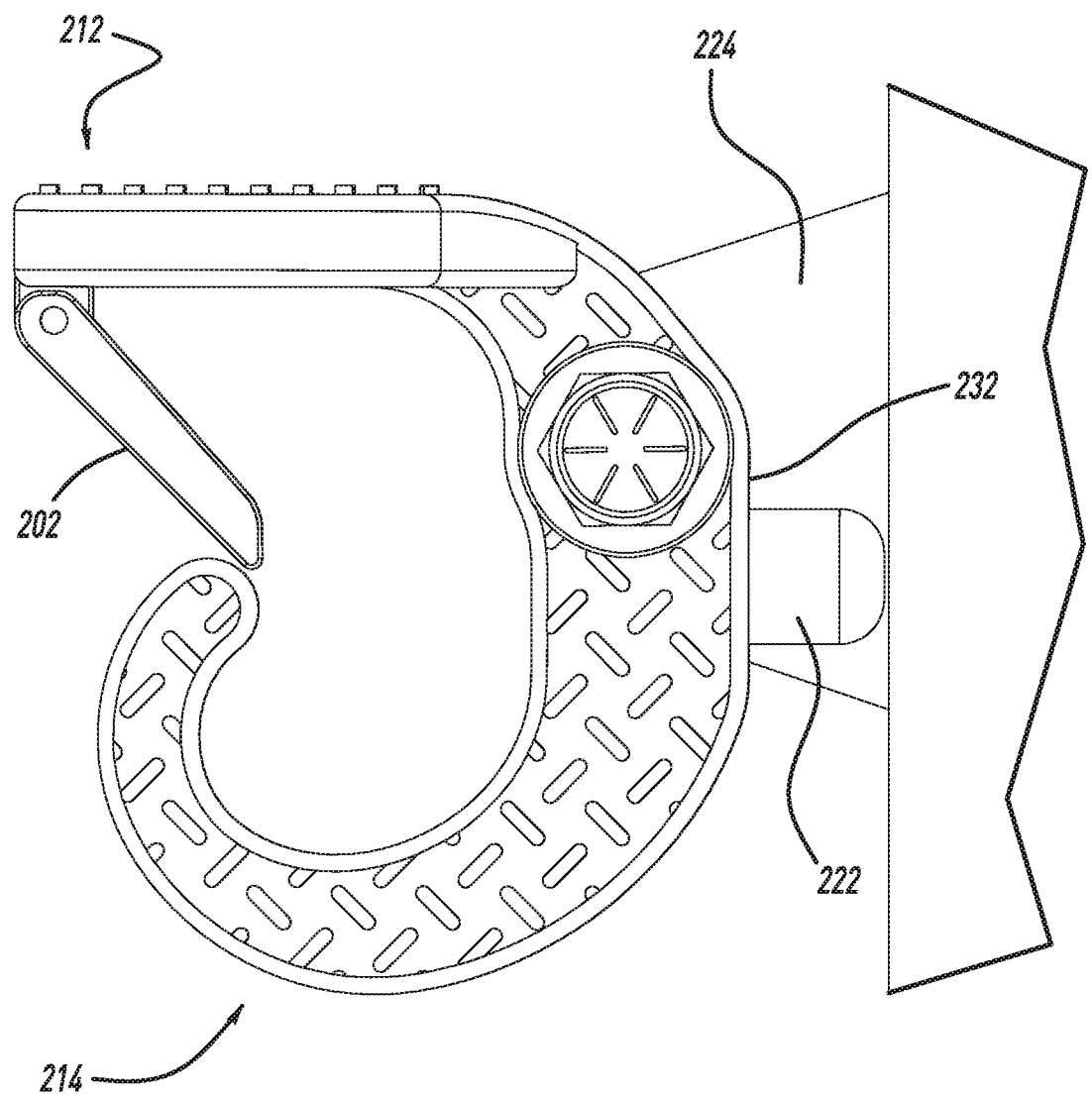
FIG. 14 is a right side elevation view of FIG. 12.
Figure 15:
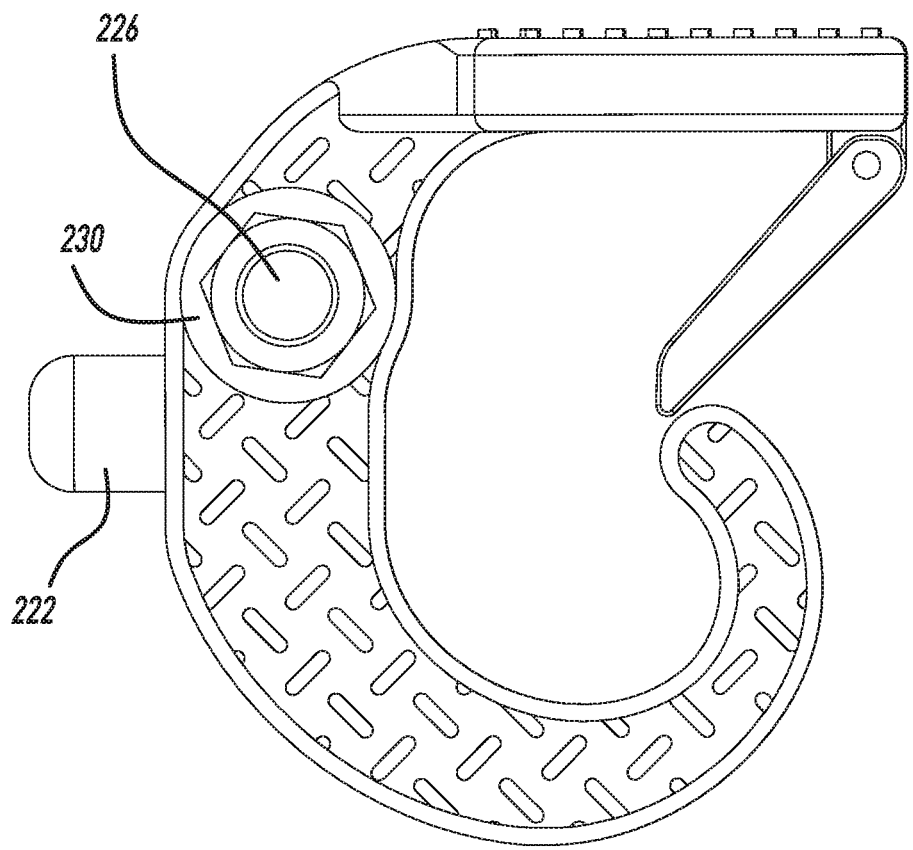
FIG. 15 is a left side elevation view of FIG. 12.
Figure 16:
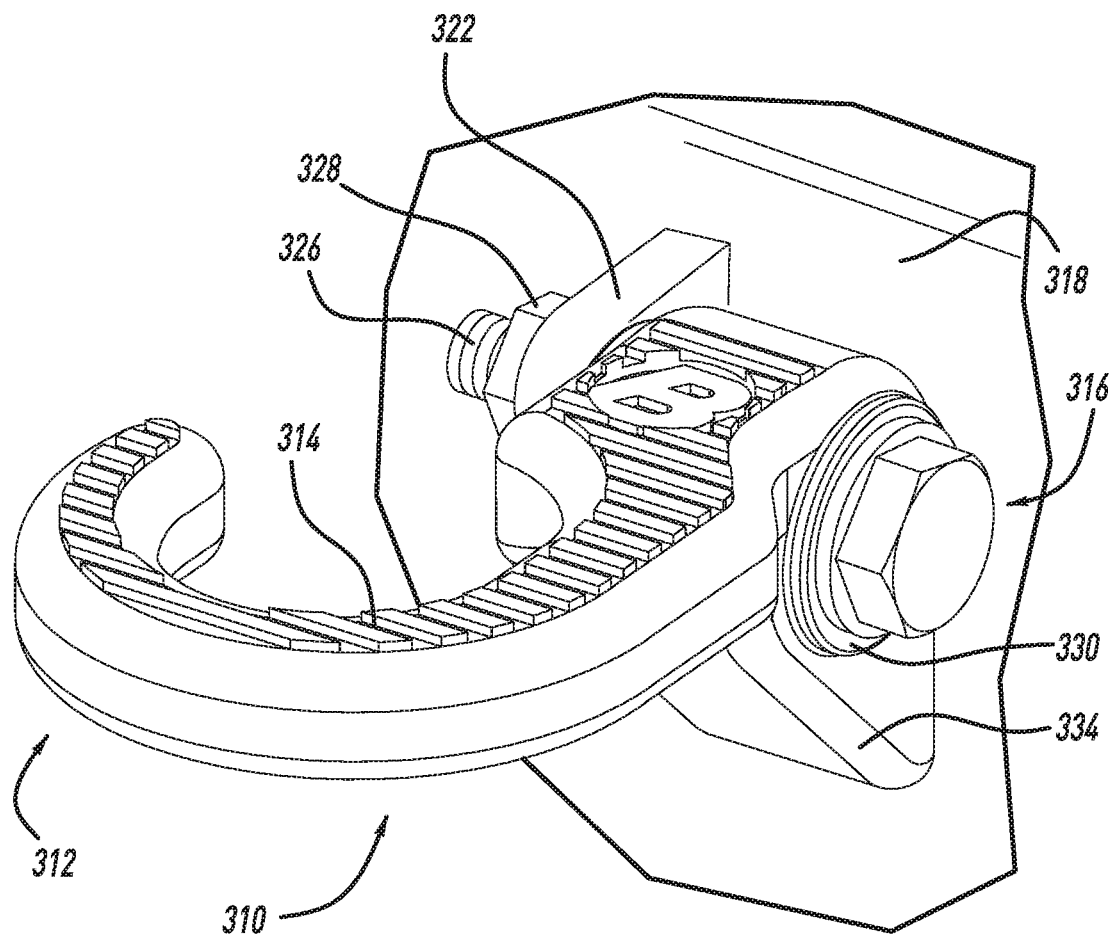
FIG. 16 is a perspective view of a tow hook step assembly with a horizontal tow hook, the assembly depicted mounted to a vehicle and shown in a combination step/tow position, in accordance with another embodiment of the present invention.

The assembly 200 has at least one step portion 212 and at least one tow hook portion shown generally at 214. The tow hook portion 214 is provided with at least one assembly mounting portion or "attachment portion" 210 to pivotally mount the assembly 200 to an attachment point 224 of the vehicle. Typically, there is provided at least one fastener 208, such as a pin, rod, nut and bolt, flanged bolt or any other fastener suitable to pivotally attach to a corresponding vehicle bumper or any other predetermined vehicle part. Preferably, the fastener 208 extends through a D-ring of a vehicle bumper to mount the assembly 200 against either side of the D-ring 224. However, any other attachment point on the vehicle suitable for the predetermined load requirements depending on the particular applications are contemplated without departing from the scope of the present invention. Typically, the bumper portion carrying the D-ring is a metal bracket or any other portion of the bumper that meets predetermined load and strength requirements. However, other mounting locations and ways of mounting to the vehicle are contemplated without departing from the scope of the present invention. Preferably, the tow hook step assembly 200 is side mounted. FIG. 13 illustrates an exemplary mounting orientation.

The tow hook step assembly 200 has at least one locking mechanism 202 to further help prevent the tow strap or tow rope from moving laterally out of the hook portion 214, e.g., such as a locking device or locking tab that rotates to generally close off the gap into the hook portion 214 when desired. In another embodiment of the present invention, there is no locking mechanism 202.

Typically, the locking mechanism 202 is a locking tab that swivels to generally close off the opening 204 into the hook portion 214 when desired. Preferably, a fastener 206, e.g., locking pin, rotatably connects the locking mechanism 202 to a bracket 203 on the step portion 212 toward one end, and the other end of the locking mechanism 202 closes off against the hook portion 214. Alternatively, the locking mechanism 202 is rotatably connected to a bracket or other feature on the hook portion 214 and closes off against the step 212. The locking mechanism 202 is operably biased to the closed position, in one embodiment, e.g., with a spring.

The tow hook step assembly 200 has at least one accessory hole 220 for selectively attaching at least one secondary component or accessory (such as trail vice, auxiliary fuel storage tank, Hi Lift Jack bracket, etc). Preferably, the accessory hole 220 is provided through the step portion 212. Optionally, at least one aperture 32 is provided for receiving a respective second fastener 34, such as a locking screw or the like, for operably connecting the accessory (such as trail vice, auxiliary fuel storage tank, Hi Lift Jack bracket, etc).

The assembly 200 is easily removable by removal of the fastener 208 from the attachment point 224 vehicle part. The fastener 208 includes a rod portion 226 with at least one threaded end 228. The rod portion 226 extends through the mounting portion 210 of the assembly 200 and the D-ring 224 and a matting bolt 230 is threaded onto the threaded portion of the rod 226 to connect the assembly 200 to the side of the D-ring 224.

The assembly 200 is in stepping position ("step mode" or "step position") when not in use for towing and/or when stepping up is desired, and rotates a predetermined amount (e.g., 35-90 degrees generally upward) to the towing position or "tow mode position" to become a heavy duty extraction point or tow hook once a strap is applied.

The tow hook step assembly 200 also has at least one bumper 222 located to prevent damage to the vehicle part. Optionally, an adjustment mechanism, as set forth previously, such as a rubber capped jackscrew, is provided operable to selectively adjust the angle depending on the particular application (e.g., to adjust the angle on the step for angled vehicle bumpers (or other vehicle part).

The tow hook portion 214 is a vertical tow hook, according to an embodiment of the present invention, preferably, a hood hanging downward with a step on top. The tow hook portion 214 is generally hook-like shaped with a bend. The hook 214 receives a rope, strap or the like through the gap or opening. Typically, the hook portion 214 is generally rotated upward and downward depending on the step and tow modes desired. Any other shapes (and latched, hinged, swivel, or screwed carabineer like, etc) for the tow portion 214 suitable for predetermined requirements, are contemplated without departing from the scope of the present invention. Optionally, a protrusion or raised edge on the distal end of the hook portion 14 provides further retention of the rope or strap.

The description of the invention is merely exemplary in nature and, thus, variations that do not depart from the gist of the invention are intended to be within the scope of the invention. Such variations are not to be regarded as a departure from the spirit and scope of the invention.

Figure 17:
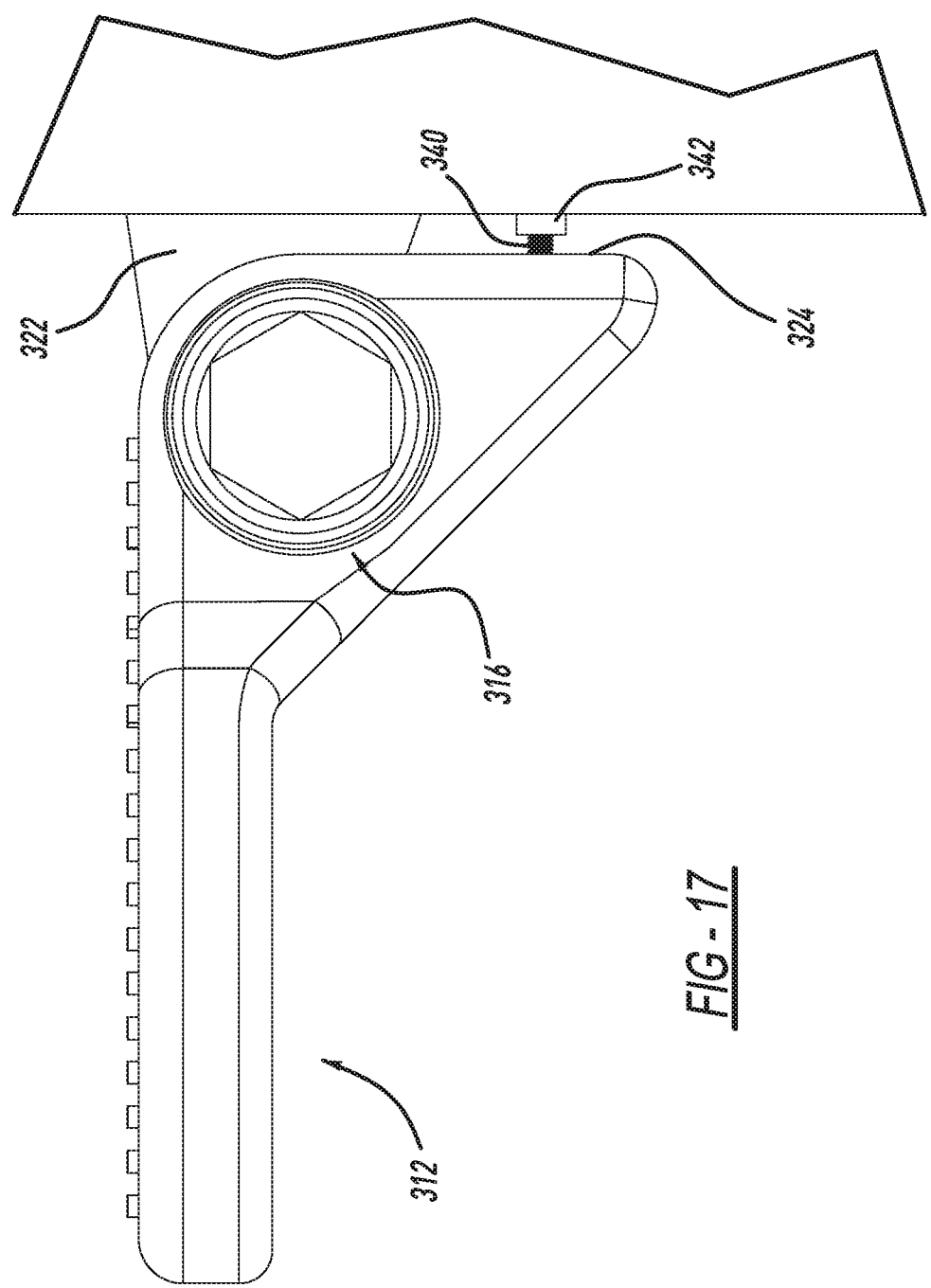
FIG. 17 is a right side elevation view of FIG. 16.
Figure 18:
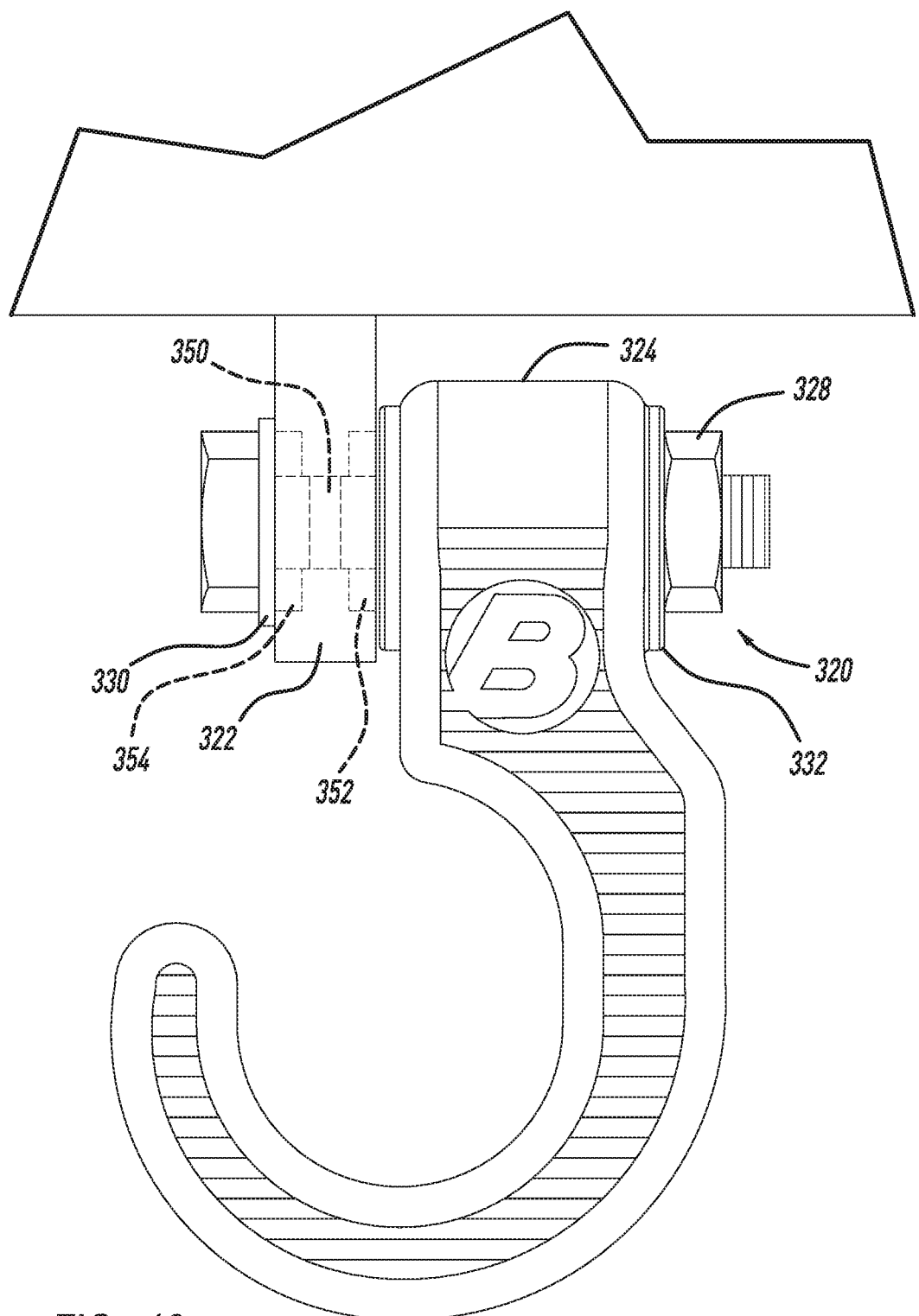
FIG. 18 is a top place view of FIG. 16.
Figure 19:
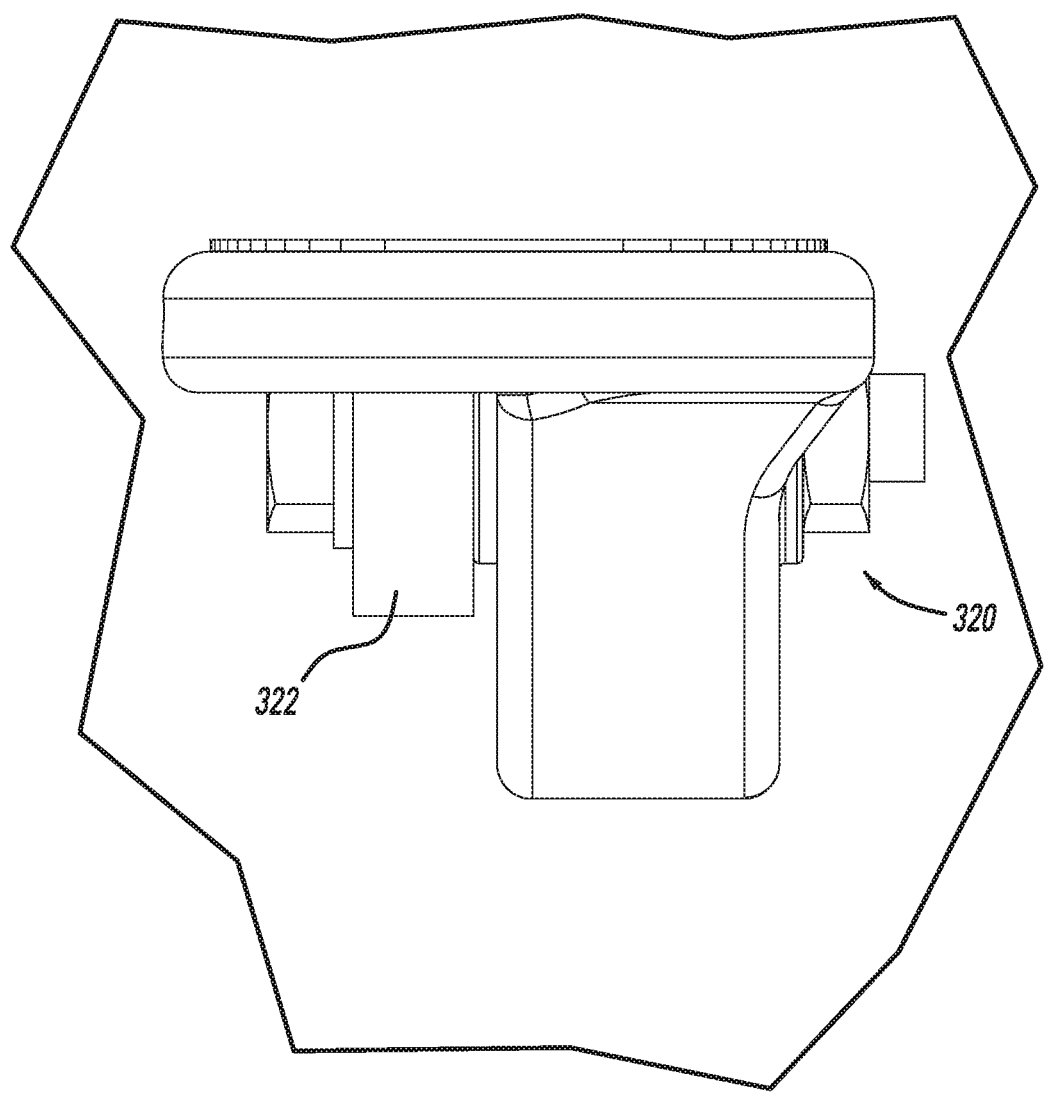
FIG. 19 is a front elevation view of FIG. 16.

Referring to FIGS. 16-20, there is provided a tow hook step assembly shown generally at 310, in accordance with an embodiment of the present invention, with improved ground clearance and a tow hook portion that is additionally a step. The assembly 310 is moveable between at least a deployed position (e.g., a combination step and towing position) and a stowed position. The tow hook portion is horizontal for towing and also to provide a stepping surface. Thus, when deployed, the tow hook step assembly 310 is in a generally horizontal position providing the operator with both a heavy duty step and a towing configuration with this single position. When stowed, the tow hook step assembly 310 is generally out of the way when the assembly 310 is not in use. FIGS. 316-19 illustrate an exemplary combination step/tow position or deployed position. FIG. 320 illustrates an exemplary stowed position.

The tow hook step assembly 310 has at least one tow hook portion shown generally at 312 that includes generally horizontal tow hook and a step surface 314 that is upwardly facing when the assembly 310 is in the deployed position. Thus, the tow hook portion 312 being horizontal also provides a step. Preferably, the step surface 314 has a non-slip feature such as a grooved pattern and/or rubber pad, etc. that is integrally formed with or operably affixed to the hook portion 312 body to provide a non-slip stepping surface for a user when the assembly 310 is in the deployed position.

The tow hook portion 312 is provided with at least one assembly mounting portion or "attachment portion", indicated generally at 316, to pivotally mount the assembly 310 to an attachment point 322 of the vehicle (e.g., 4-door Jeep™ types, 2-door Jeep™ types, SUVs, trucks, hybrids, crossovers, utility task vehicles, and any other type of vehicles). Typically, there is provided at least one fastener shown generally at 320, such as a pin, rod, nut, bolt or any other fastener and combinations thereof suitable to pivotally attach to a corresponding vehicle bumper or any other predetermined vehicle part and attachment point that meets predetermined load and strength requirements depending on the application. By non-limiting example, the fastener extends through a D-ring 322 of a vehicle bumper. Preferably, the fastener 320 includes a flanged bolt 330, a at least partially threaded rod 350, 326, and a threaded nut 328 with a washer 332 or a fixed flange. Preferably, the tow hook step assembly 310 is side mounted. FIGS. 16-20 illustrates an exemplary mounting orientation. However, other mounting locations and ways of mounting to the vehicle are contemplated without departing from the scope of the present invention, e.g., mounting on the other side of the attachment point feature. In addition, FIG. 18 illustrates that the fastener 320 can be connected in either direction (cf. FIG. 16).

At least one adjustment mechanism 340 with a cap 342 (See FIG. 17) is provided (e.g., a jackscrew with a rubber cap) to selectively adjust the angle depending on the particular application. By way of example, the stop adjusts the angle on the step for angled vehicle bumpers (or other vehicle part). The rubber capped mechanism 340 also keeps the back surface 324 of the casting from contacting the vehicle thereby preventing scratching of the vehicle surface.

Optionally, the tow hook step assembly 310 also has at least one stop, e.g., bumper as described previously.

Optionally, the tow hook step assembly 310 has at least one accessory hole for selectively attaching at least one secondary component or accessory (such as trail vice, auxiliary fuel storage tank, Hi Lift Jack bracket, etc).

Optionally, the tow hook step assembly 310 has at least one locking mechanism to further prevent the tow strap or tow rope from moving out of the hook portion 312, e.g., such as a locking device that rotates to generally close off the opening into the hook portion 312 when desired.

The tow hook portion 312 is generally hook shaped to receive and hold Any other shapes (and latched, hinged, swivel, or screwed carabineer like, etc) for the tow portion 312 suitable for predetermined requirements, are contemplated without departing from the scope of the present invention.

Figure 20:
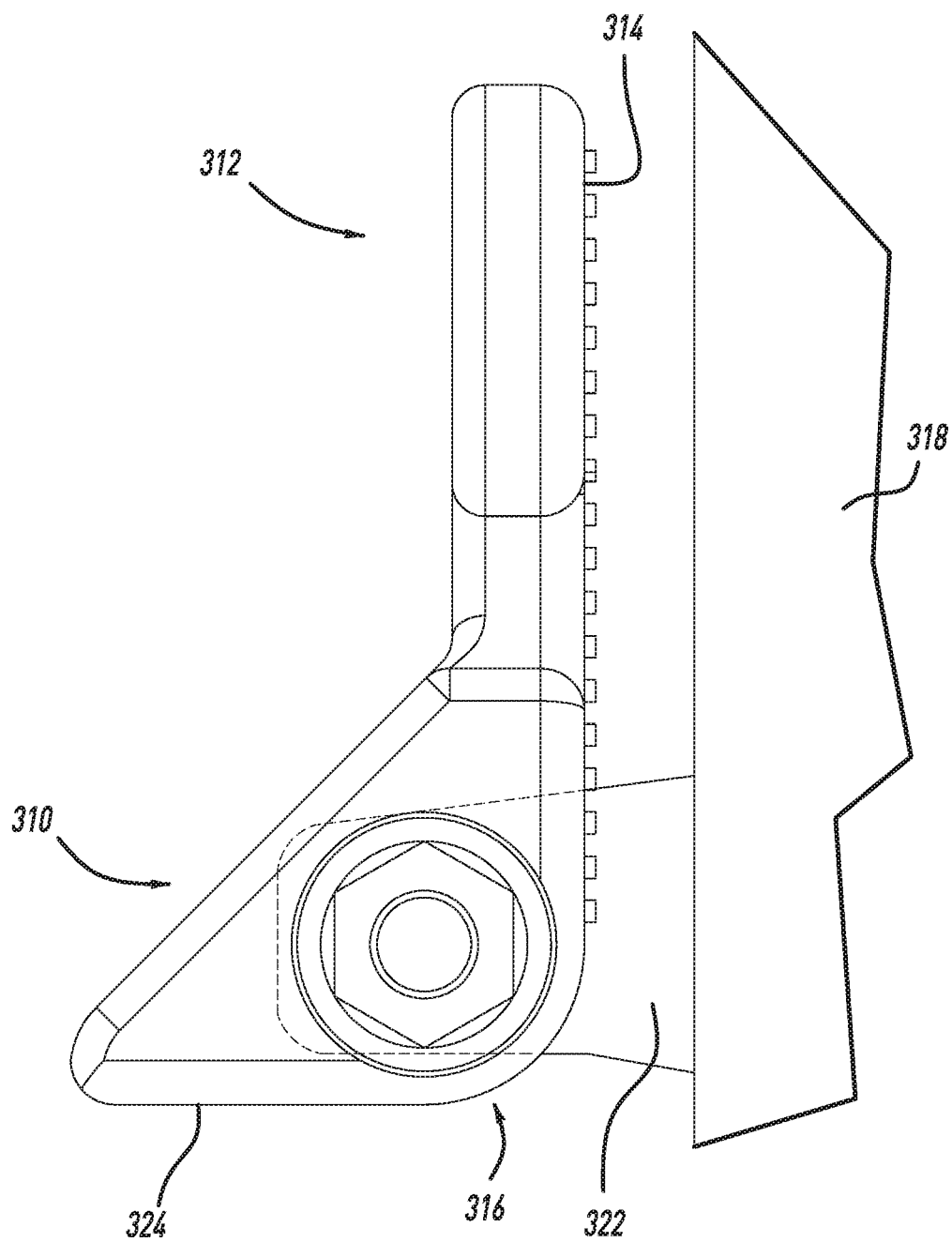
FIG. 20 is a right side elevation of the tow hook step assembly of FIGS. 16-19 shown in a stowed position, in accordance with the present invention.

The distance depicted in FIGS. 17 and 20 between the tow hook step assembly 310 and vehicle 318 is illustrative of an environment of use and not intended to be limiting. The distance may be more or less, typically, more or less than 1 inch, preferably, more or less than 0.5 inches, most preferably about 0.25 to 0.5 inches when in the horizontal position.

When not in use as a step/tow hook, an operator manually rotates the hook portion 312, e.g., rotates about 90 degrees (preferably, upward 90 degrees), into the stowed position when desired to reduce the front projected profile of the tow hook step assembly 310 (see FIG. 20).

At least one inner rubber bushing to add resistance to keep the step up for driving or trail riding can be provided, as set forth above.

At least one inner rubber bushing to add resistance to keep the step up for driving or trail riding is provided. This helps increase ground clearance as well. FIG. 18 depicts a rod portion 350 of the fastener 316 through the D-ring 322 aperture and with two bushings 352, 354, most preferably, flanged bushings. The bushings 352, 354 have a durometer of 80 Shore A. However, other durometers are contemplated depending on the application without departure from the scope of the present invention.

The present invention adds a step to the bumper in order to access roof of vehicle, which is a significant advantage over conventional D-rings and tow hooks. The simple assembly 310 of the present invention also provides a step and tow hook combined into one piece.

The assembly 310 is easily removable by removal of the fastener 320, e.g., removal of a bolt or pin. The assembly 310 is in a generally horizontal deployed position (or "step/tow position") to become a step and a heavy duty extraction point or tow hook once a strap is applied, and rotates to a generally vertical stowed position when not in use.

The present invention effectively and efficiently combines the step surface 314 and hook portion 312 as one accessory that is easily removable Typically, the step surface 314 and/or hook portion 312 are metal, preferably, steel. Other materials suitable to meeting predetermined requirements depending on the application are contemplated without departing from the scope of the present invention. Typically, the hook portion 314 with the step surface are integrally formed. Alternatively, they are separate pieces operably connected together forming a mountable unit.

At least one tow hook step assembly 310 is attached to the bumper (or other vehicle part). A plurality of tow hook step assemblies 310 each attached to a respective one of a plurality of attachment points 322 (e.g., D-rings) on the bumper 18 (or other vehicle part) is contemplated without departing from the scope of the present invention.

In another embodiment of the present invention the tow hook step assembly 310 is fixed to the vehicle and does not rotate between a deployed and stowed position. Rather, the combination step/hook portion 312, 314 is always generally horizontal whether being used or not.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A tow hook step assembly for a vehicle, comprising:
   a combination tow and step portion;
   at least one fastener to rotatably connect the combination tow and step portion to the vehicle, wherein the combination tow and step portion is rotatable between at least a first position and a second position; and
   an adjustment mechanism that is rotatable to adjust the combination tow and step portion in a horizontal direction with respect to an angled part of the vehicle, said adjustment mechanism including a protective bumper for contact with the angled part of the vehicle.

2. The tow hook step assembly of claim 1, wherein the adjustment mechanism is a jackscrew with a rubber bumper.

3. The tow hook step assembly of claim 1, wherein the at least one fastener includes a bolt mounting an attachment portion of the combination tow and step portion to one side of a bracket of the vehicle.

4. The tow hook step assembly of claim 1, wherein the at least one fastener includes a bolt mounting an attachment portion of the combination tow and step portion to both sides of a bracket of the vehicle.

5. The tow hook step assembly of claim 1, further comprising at least one inner bushing operably coupled to the at least one fastener to add resistance when the combination tow and step portion is in the second position.

6. The tow hook step assembly of claim 1, further comprising at least one accessory aperture with at least one second fastener for attaching secondary accessories.

7. The tow hook step assembly of claim 1, wherein the combination tow and step portion is a horizontal tow hook also having a step surface when in the first position to selectively provide both towing and stepping when either is desired.

8. The tow hook step assembly of claim 1, wherein the combination tow and step portion rotates about 90 degrees from the first position to the second position, wherein the second position is a stowed position to improve ground clearance.

9. The tow hook step assembly of claim 1, wherein the combination tow and step portion is a vertical tow hook with a step portion on top when in the first position.

10. The tow hook step assembly of claim 1, wherein the combination tow and step portion includes a step portion and a tow hook portion, wherein the first position is a step mode position for using the step portion, and, wherein the second position is a tow mode position for using the tow hook portion as a tow hook with a pulled strap or tow rope.

11. The tow hook step assembly of claim 10, wherein, after attaching the tow rope or strap to the tow hook portion, the combination tow and step portion automatically rotates 35 to 90 degrees into the tow mode position capturing the tow rope or strap for vehicle extraction.

12. The tow hook step assembly of claim 10, further comprising at least one locking mechanism rotatably connected to the combination tow and step portion to selectively close off a gap in the tow hook portion for retaining the strap or tow rope in the tow hook portion.

13. A tow hook/step assembly for a vehicle, comprising:
    at least one step portion;
    at least one tow hook portion integrally formed with the at least one step portion,
    at least one fastener extending through an attachment portion of the tow hook/step assembly to rotatably mount the tow hook/step assembly to a vehicle part, wherein the tow hook portion rotates between at least a first position and a second position to provide at least a step and a towing position; and
    a jackscrew on a rear surface of the tow hook portion to adjust the positioning of the tow hook/step assembly when the vehicle part is angled.

14. The tow hook/step assembly of claim 13, wherein the at least one tow hook portion is a vertical tow hook with a stepping surface on top when in the first position to selectively provide a combination step and towing as desired.

15. The tow hook/step assembly of claim 13, wherein the at least one tow hook portion is a vertical tow hook with a stepping surface above the vertical tow hook when in the first position, wherein when in the first position the step portion is horizontal for use as a step, and, wherein when rotated to the second position the tow hook portion is in an extraction/towing position.

16. The tow hook/step assembly of claim 13, further comprising at least one accessory aperture and at least one aperture with a second fastener to selectively mount at least one secondary component when desired.

17. The tow hook/step assembly of claim 13, further comprising at least one inner bushing coupled to the at least one fastener to add predetermined resistance against rotation when in the second position.

18. A combination tow hook/step assembly for a vehicle, comprising:
    at least one step portion with a step surface;
    at least one tow hook portion integrally formed with the at least one step portion;
    at least one fastener extending through an attachment portion of the tow hook portion to rotatably mount the tow hook portion to a side of a D-ring bracket of the vehicle, wherein the combination tow hook/step assembly rotates between at least a first position to provide a step via a horizontal step surface and a second position that is a stowed position or a towing position.

\* \* \* \* \*